United States Patent
Zhang et al.

(10) Patent No.: US 11,751,254 B2
(45) Date of Patent: *Sep. 5, 2023

(54) SYSTEM INFORMATION REQUESTING METHOD, CORRESPONDING USER EQUIPMENT, AND COMPUTER-READABLE MEDIUM

(71) Applicants: Sharp Kabushiki Kaisha, Sakai (JP); FG Innovation Company Limited, Tuen Mun (HK)

(72) Inventors: Chongming Zhang, Shanghai (CN); Shohei Yamada, Sakai (JP); Renmao Liu, Shanghai (CN)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,379

(22) Filed: Apr. 21, 2022

(65) Prior Publication Data
US 2022/0248472 A1    Aug. 4, 2022

Related U.S. Application Data

(63) Continuation of application No. 16/632,490, filed as application No. PCT/CN2018/096629 on Jul. 23, 2018, now Pat. No. 11,337,252.

(30) Foreign Application Priority Data

Jul. 27, 2017   (CN) .................. 201710627134.X

(51) Int. Cl.
*H04W 74/08*    (2009.01)
*H04W 76/27*    (2018.01)
(Continued)

(52) U.S. Cl.
CPC ....... *H04W 74/0833* (2013.01); *H04L 5/0055* (2013.01); *H04W 74/008* (2013.01); *H04W 76/27* (2018.02)

(58) Field of Classification Search
CPC ............. H04W 74/0833; H04W 76/27; H04W 74/008; H04W 48/16; H04W 48/08;
(Continued)

(56) References Cited

U.S. PATENT DOCUMENTS 10,764,929 B2 * 9/2020 Kim ...................... H04W 72/23
2009/0201873 A1   8/2009 Korhonen
(Continued)

FOREIGN PATENT DOCUMENTS

| CN | 103916974 A | 7/2014 |
| CN | 105379336 A | 3/2016 |

(Continued)

OTHER PUBLICATIONS

62450568,Drawings—only_black_and_white_line_drawings,Jan. 26, 2017 (Year: 2017).*
(Continued)

*Primary Examiner* — Chi H Pham
*Assistant Examiner* — Ji-Hae Yea
(74) *Attorney, Agent, or Firm* — Finnegan, Henderson, Farabow, Garrett & Dunner, L.L.P.

(57) ABSTRACT

A method for providing System Information (SI), the method including transmitting information about first associations between a plurality of preamble sequences and a plurality of pieces of SI, and about second associations between the pieces of SI and a plurality of system information blocks (SIBs); receiving a preamble from a user equipment (UE), the preamble including one of the preamble sequences; identifying one of the SIBs based on the one of the preamble sequences, the first associations, and the sec-
(Continued)

ond associations, the one of the SIBs including one of the pieces of SI associated with the one of the preamble sequences; and transmitting the one of the SIBs to the UE.

17 Claims, 4 Drawing Sheets

(51) Int. Cl.
    *H04L 5/00*     (2006.01)
    *H04W 74/00*     (2009.01)
(58) Field of Classification Search
    CPC .............. H04W 74/002; H04W 74/085; H04L 5/0055; H04L 5/0048; H04L 5/0053; H04L 5/0062; H04L 5/0091
    See application file for complete search history.

(56) References Cited

U.S. PATENT DOCUMENTS

| | | | |
|---|---|---|---|
| 2015/0016312 A1 | 1/2015 | Li et al. | |
| 2015/0245378 A1 | 8/2015 | Kim et al. | |
| 2018/0310235 A1* | 10/2018 | You | H04W 48/16 |
| 2018/0324679 A1* | 11/2018 | Basu Mallick | H04W 48/14 |
| 2019/0174554 A1* | 6/2019 | Deenoo | H04W 72/0453 |
| 2020/0029365 A1* | 1/2020 | Kim | H04W 72/23 |
| 2021/0136824 A1 | 5/2021 | Zhang et al. | |

FOREIGN PATENT DOCUMENTS

| | | |
|---|---|---|
| CN | 105453477 A | 3/2016 |
| CN | 106792998 A | 5/2017 |
| EP | 3 481 111 A1 | 5/2019 |
| ER | 3 331 306 A1 | 6/2018 |
| WO | WO 2016/128930 A1 | 8/2016 |
| WO | WO 2017/113279 A1 | 7/2017 |
| WO | WO 2018/139852 A1 | 8/2018 |

OTHER PUBLICATIONS

62450568,Specification,Jan. 26, 2017 (Year: 2017).*
62491360,Drawings—only_black_and_white_line_drawings,Apr. 28, 2017 (Year: 2017).*
62491360,Specification,Apr. 28, 2017 (Year: 2017).*
IP Australia, Australian Government, Examination Report No. 2 for Standard Patent Application in relation to Australian Application No. 2018308491, dated Oct. 27, 2022 (3 pages).
European Patent Office, Communication Pursuant to Article 94(3) EPC in relation to Application No. 18 839 123.9-1216, dated Oct. 19, 2022 (9 pages).
Ericsson, Open Issues of On-Demand SI, 3GPP TSG-RAN WG2#97bis, R2-1702857, Spokan, USA Apr. 3-7, 2017 (7 pages).
CATT, On-Demand System Information Delivery Mechanism, 3GPP TSG RAN WG2 Meeting #95, R2-164811, Gothenburg, Sweden, Aug. 22-26, 2016 (6 pages).
Samsung, System Information Signaling Design in NR, 3GPP TSG-RAN WG2 Meeting #94, R2-163371, Nanjing, China, May 23-27, 2016 (7 pages).
NEC, LTE BCH-On-Demand, TSG-RAN Working Group2 #55, R2-062930, Seoul, Korea, Oct. 9-13, 2006 (5 pages).
Chinese Patent Office, First Office Action in relation to CN Application No. 201710627134.X, dated May 20, 2021 (17 pages).
Samsung, "On Demand SI: Further Details of MSG3 Approach," 3GPP TSG-RAN WG2 Meeting #98 R2-1704050, May 15-19, 2017 (4 pages).
Chinese Patent Office, First Search Report in relation to CN Application No. 201710627134.X, dated May 20, 2021 (2 pages).
Vivo, "Minimum SI configuration for other SI request via MSG1," 3GPP TSG-RAN WG2 Meeting #98 R2-1704586, May 15-19, 2017 (5 pages).
China Patent Office, International Search Report in relation to PCT/CN2018/096629, dated Oct. 15, 2018 (5 pages).
NTT Docomo, "New SID Proposal: Study on New Radio Access Technology," RP-160671, 3GPP TSG RAN Meeting #71, Göteborg, Sweden, Mar. 7-10, 2016.
CATT, "On-demand System Information Delivery Mechanism", 3GPP TSG RAN WG2 Meeting #95 R2-164811, Aug. 21, 2016 (Aug. 21, 2016).
NEC, "LTE BCH—on-demand", TSG-RAN Working Group 2 #55 R2-062930, Oct. 5, 2006 (Oct. 5, 2006).
Samsung, "System Information Signaling Design in NR", 3GPP TSG-RAN WG2 Meeting #94 R2-163371, May 22, 2016 (May 22, 2016).
Ericsson, "Open issues of on-demand SI", 3GPP TSG-RAN WG2 #97 bis R2-1702857, Apr. 3, 2017 (Apr. 3, 2017).
62502445, Specification May 5, 2017.
Lenovo, Motorola Mobility ("Details of On-Demand SI requests," 3GPP TSG-RAN WG2 Meeting #97 bis, R2-1702733, Apr. 3-7, 2017.
62450568, Specification Jan. 26, 2017.
62450568, Drawings—only black and white line drawings Jan. 26, 2017.
62491360, Specification Apr. 28, 2017.
62491360, Drawings—only black and white line drawings Apr. 28, 2017.

* cited by examiner

SYSTEM INFORMATION REQUESTING METHOD, CORRESPONDING USER EQUIPMENT, AND COMPUTER-READABLE MEDIUM

CROSS-REFERENCE TO RELATED APPLICATIONS

This application is a continuation of U.S. application Ser. No. 16/632,490, filed Jan. 20, 2020, which is a National Stage Entry of International Application No. PCT/CN2018/096629, filed Jul. 23, 2018, and claiming the benefit of priority from Chinese Patent Application No. 201710627134.X, filed Jul. 27, 2017. The entire contents of all the above applications are hereby incorporated by reference.

TECHNICAL FIELD

The present disclosure relates to the technical field of wireless communications. More specifically, the present disclosure relates to a system information requesting method, corresponding user equipment, and a computer-readable medium.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the Third Generation Partnership Project (3GPP) RAN #64 plenary session held in March 2016, a research topic on new 5G radio access technology was proposed (see non-patent literature: RP-160671 New SID Proposal: Study on New Radio Access Technology). In the description of the work item, the operating frequency band of future new communication RATs could be expanded to 100 GHz, which would at least satisfy requirements for enhanced mobile broadband services, requirements for communication between massive Internet of Things terminals, requirements for service with high reliability requirements, and so on. The research work of the item was expected to end in 2018.

In a 5G system, UE can obtain required system information by means of requesting. The requesting process may be that the UE sends a preamble sequence to a base station; and after receiving the preamble sequence, the base station transmits system information (SI) associated with the preamble sequence on a predetermined time-frequency resource. See WO 2017113279 A1 for example. However, due to the limited nature of the preamble sequences and a variety of SI types and combinations thereof that UE expects to acquire, the problem of how to acquire a plurality of pieces of SI in a process of UE initiating an SI request needs to be addressed.

SUMMARY

The objective of the present disclosure is to resolve the technical problem described above. Specifically, the present disclosure aims to resolve the technical problem of how to acquire a plurality of pieces of SI in a process of UE initiating an SI request.

In order to achieve the above objective, a first aspect of the present disclosure provides a method executed at UE, comprising:
  receiving, from a base station, information carrying direct or indirect associations between preamble sequences and system information blocks (SIBs);
  selecting a corresponding preamble sequence based on one or a plurality of required SIBs and received associations according to at least one of the following criteria:
    selecting a single preamble sequence associated with the greatest number of required SIBs;
    selecting a single preamble sequence associated with the fewest number of not-required SIBs;
    selecting one or a plurality of preamble sequences associated with the one or plurality of required SIBs having the fewest total number;
    selecting, according to a priority of the one or plurality of required SIBs, different preamble sequences respectively associated with required SIBs of different priorities; and
  transmitting the selected preamble sequences to the base station so as to send a request to the base station for the one or plurality of required SIBs.

A second aspect of the present disclosure provides a method executed at UE, comprising:
  receiving, from a base station, information carrying direct or indirect associations between preamble sequences and system information blocks (SIBs);
  selecting, based on one or a plurality of required SIBs and the received associations, different preamble sequences respectively associated with required SIBs of different priorities;
  selecting, for the required SIBs of different priorities, corresponding preamble sequences based on the one or plurality of required SIBs and the received associations according to at least one of the following criteria:
    selecting a single preamble sequence associated with the greatest number of required SIBs;
    selecting a single preamble sequence associated with the fewest number of not-required SIBs;
    selecting one or a plurality of preamble sequences associated with the one or plurality of required SIBs having the fewest total number; and
  transmitting the selected preamble sequences to the base station so as to send a request to the base station for the one or plurality of required SIBs.

In an exemplary embodiment of the foregoing method, the direct associations comprise: associations between preamble sequences and SIBs; the indirect associations comprise: associations between preamble sequences and system information (SI), and associations between SI and SIBs.

In an exemplary embodiment of the foregoing method, if the indirect associations are received, the UE determines, based on the one or plurality of required SIBs and the associations between SI and SIBs, one or a plurality of pieces of SI with which the one or plurality of required SIBs are associated to, and further selects a corresponding preamble sequence according to the associations between preamble sequences and SI; and transmits the selected preamble sequence to the base station to send a request to the base station for the one or plurality of pieces of SI with which the one or plurality of required SIBs are associated.

A third aspect of the present disclosure provides UE, comprising:

a communication interface, configured to receive, from a base station, information carrying direct or indirect associations between preamble sequences and system information blocks (SIBs);

a processor; and a memory, storing thereon computer-executable instructions; when the instructions are executed by the processor, the processor is enabled to perform the following operations:

selecting a corresponding preamble sequence based on one or a plurality of required SIBs and received associations according to at least one of the following criteria:

selecting a single preamble sequence associated with the greatest number of required SIBs;

selecting a single preamble sequence associated with the fewest number of not-required SIBs;

selecting one or a plurality of preamble sequences associated with the one or plurality of required SIBs having the fewest total number;

selecting, according to a priority of the one or plurality of required SIBs, different preamble sequences respectively associated with required SIBs of different priorities; and the communication interface is further configured to transmit the selected preamble sequences to the base station so as to send a request to the base station for the one or plurality of required SIBs.

A fourth aspect of the present disclosure provides UE, comprising:

a communication interface, configured to receive, from a base station, information carrying direct or indirect associations between preamble sequences and system information blocks (SIBs);

a processor; and a memory, storing thereon computer-executable instructions; when the instructions are executed by the processor, the processor is enabled to perform the following operations:

selecting, based on one or a plurality of required SIBs and the received associations, different preamble sequences respectively associated with required SIBs of different priorities;

selecting, for the required SIBs of different priorities, corresponding preamble sequences based on the one or plurality of required SIBs and the received associations according to at least one of the following criteria:

selecting a single preamble sequence associated with the greatest number of required SIBs;

selecting a single preamble sequence associated with the fewest number of not-required SIBs;

selecting one or a plurality of preamble sequences associated with the one or plurality of required SIBs having the fewest total number; and the communication interface is further configured to transmit the selected preamble sequences to the base station so as to send a request to the base station for the one or plurality of required SIBs.

In an exemplary embodiment of the foregoing UE, the direct associations comprise: associations between preamble sequences and SIBs; the indirect associations comprise: associations between preamble sequences and system information (SI), and associations between SI and SIBs.

In an exemplary embodiment, when the instructions are executed by the processor, the processor is further enabled to perform the following operations:

if the indirect associations are received, the UE determines, based on the one or plurality of required SIBs and the associations between SI and SIBs, one or a plurality of pieces of SI with which the one or plurality of required SIBs are associated, and further selects a corresponding preamble sequence according to the associations between preamble sequences and SI; and the communication interface is further configured to transmit the selected preamble sequences to the base station so as to send a request to the base station for the one or plurality of pieces of SI with which the one or plurality of required SIBs are associated.

A fifth aspect of the present disclosure provides a computer-readable medium, storing instructions thereon; when the instructions are executed by a processor, the processor is enabled to execute the foregoing method.

The foregoing solutions provided by the present disclosure can decrease the number of SIBs, not required by UE, that a base station transmits, thereby saving power and energy, reducing the number of times the UE transmits preamble sequences, which in turn reduces access resources and avoids access collisions. The solutions further facilitates the determination of a transmitting order of preamble sequences. More specifically, the above solutions provided by the present disclosure can decrease the number of SIBs, not required by UE, that a base station transmits by selecting a preamble sequence associated with the greatest number of required SIBs and/or selecting a single preamble sequence associated with the fewest number of not-required SIBs, thereby saving power and energy; reduce the number of times the UE transmits preamble sequences by selecting one or a plurality of preamble sequences associated with the one or plurality of required SIBs having the fewest total number, thereby reducing access resources and avoiding access collisions; and separately request necessarily required SIBs and unnecessarily required SIBs with different preamble sequences by selecting different preamble sequences respectively associated with required SIBs of different priorities/importance, thereby facilitating the determination of a transmitting order of preamble sequences.

Additional aspects and advantages of the present disclosure will be described in the following description, which will become apparent from the description below or be understood through the practice of the present disclosure.

DESCRIPTION OF THE DRAWINGS

The above and other features of the present disclosure will become more apparent with the following detailed description in conjunction with the accompanying drawings.

DETAILED DESCRIPTION

Figure 1:
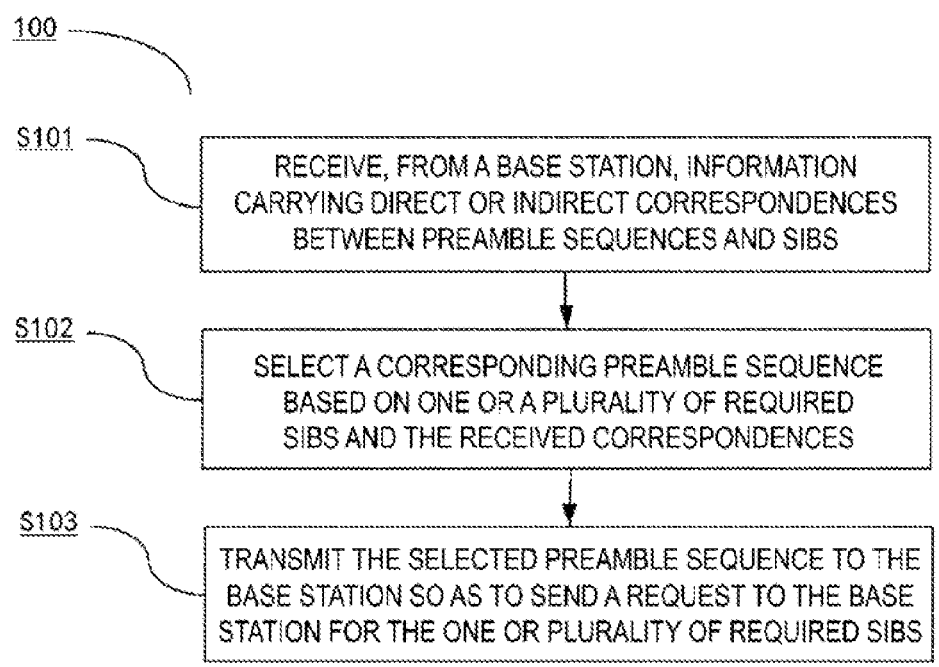
FIG. 1 schematically shows a flowchart of a method for requesting to acquire SI/SIB executed at UE according to an exemplary embodiment of the present disclosure.

The following describes the present application in detail with reference to the accompanying drawings and specific implementations. It should be noted that the present application should not be limited to the specific implementations described below. In addition, for simplicity, detailed description of the known art not directly related to the present application is omitted to prevent confusion in understanding the present application.

A plurality of implementations according to the present invention are specifically described below by using an LTE mobile communication system and its subsequent evolved version as an exemplary application environment. However, it should be noted that the present invention is not limited thereto, but is applicable to other wireless communications systems, such as a future 5G cellular communications system, and is applicable to other base stations and terminal devices, such as base stations and terminal devices supporting eMTC (enhanced Machine-Type Communication), MMTC (Massive Machine-Type Communication), etc.

Prior to the specific description, several terms mentioned in the present invention are illustrated as follows. The terms involved in the present invention shall have the meanings set forth below, unless otherwise indicated.

UE: User Equipment
MAC: Medium Access Control
RRC: Radio Resource Control
Preamble: Preamble Sequence
SIB: System Information Block
SI: System Information
RAPID: Random Access Preamble Identifier Each SI message may comprise one or a plurality of SIB types, hereinafter referred to as SIBs (herein, the terms "SIB" and "SIB type" may be used interchangeably). Which SIBs are comprised in one SI message can be broadcast to UE via specific system information. Generally, SIBs with the same scheduling period can be mapped to the same SI. One SI message may contain only one SIB; only one SI message may be transmitted in one SI window; and one SI message may be associated with one SI window. Further, such associations may be that only this SI message can be transmitted in this SI window, and can be adequately transmitted many times. When receiving SI, the UE may continuously detect an SI-RNTI (Radio Network Temporary Identity) in the SI window until receiving an SI message or when it reaches the end of the window length.

Considering that the above associations may exist among SIBs, SI, and SI windows, SIBs, SI, and SI windows having the above one-to-one associations can be used interchangeably.

In addition, the first step of a random access procedure is that UE transmits a preamble sequence. The main function of the preamble sequence is to inform a base station of the presence of a request. The random access procedure for requesting system information may be the same as a common random access procedure, or may be a separately designed random access procedure for requesting system information. The first step of both, however, is to transmit a preamble sequence. The preamble sequence may be transmitted over a PRACH (Physical Random Access Channel); and the base station, by broadcasting dedicated system information, notifies all UE of time-frequency resources on which transmission of the preamble sequence is allowed. Since the number of preamble sequences is large, only index numbers or identification numbers associated with the preamble sequences may be broadcast in broadcast information; and the index numbers or the identification numbers of the preamble sequences are in one-to-one association to the preamble sequences. Therefore, preamble sequences can be used interchangeably with index numbers or identification numbers thereof herein.

A method executed at UE for requesting to acquire SI/SIB according to an exemplary embodiment of the present disclosure will be described below with reference to FIG. 1.

FIG. 1 is a flowchart of a method 100 executed at UE for requesting to acquire SI/SIB according to an exemplary embodiment of the present disclosure. As shown in FIG. 1, the method 100 may comprise steps S101, S102, and S103.

In step S101, the UE may receive, from a base station, information carrying direct or indirect associations (or referred to as mappings, which may be used interchangeably herein) between preamble sequences and SIBs. This information may be carried in a particular SI message or SIB broadcast by the base station to all UE within its serving cell.

In this context, the direct associations may be associations between preamble sequences and SIBs, as shown in the example given in Table 1 below; or they may be associations among preamble sequences, SIBs, and SI with which the SIBs are associated, as shown in the example given in Table 2 below.

TABLE 1

| SIB | Preamble sequence |
| --- | --- |
| First SIB | First preamble sequence; second preamble sequence; third preamble sequence |
| Second SIB | Second preamble sequence; third preamble sequence |
| Third SIB | First preamble sequence; second preamble sequence; third preamble sequence |
| Fourth SIB | Fourth preamble sequence |

TABLE 2

| SIB | Associated SI | Preamble sequence |
| --- | --- | --- |
| First SIB | First SI | First preamble sequence; |
| Second SIB | First SI | second preamble sequence |
| Third SIB | Second SI | Second preamble sequence |
| Fourth SIB | Second SI | |

Herein, the first SI and the second SI can be distinguished by scheduling information thereof.

The indirect associations may comprise: associations between preamble sequences and SI, and associations between SI and SIBs, as shown in the example given in Table 3 below.

TABLE 3

| Preamble sequence | SI |
| --- | --- |
| First preamble sequence | First SI |
| Second preamble sequence | Second SI |
| Third preamble sequence | First SI and second SI |
| Fourth preamble sequence | First SI and third SI |

TABLE 4

| SIB | Associated SI |
| --- | --- |
| First SIB | First SI |
| Second SIB | First SI |

TABLE 4-continued

| SIB | Associated SI |
| --- | --- |
| Third SIB | Second SI |
| Fourth SIB | Second SI |

In step S102, the UE may select a corresponding preamble sequence based on one or a plurality of required SIBs and the received associations.

Specifically, the UE may determine, according to a required function, a supported feature, or subscription information thereof, one or a plurality of SIBs or pieces of SI that the UE needs to acquire.

If the aforementioned direct associations are received, the UE may select a corresponding preamble sequence according to one or a plurality of required SIBs and the associations between preamble sequences and SIBs.

If the aforementioned indirect associations are received, the UE may determine, according to one or plurality of required SIBs and the associations between SI and SIBs, one or a plurality of pieces of required SI with which the one or plurality of required SIBs are associated, and further select a corresponding preamble sequence according to the associations between preamble sequences and SI. Different SI scheduling information may be handled differently. For example, if the UE needs to acquire SIB1 and SIB2, an SI period carrying SIB1 is T1, and an SI period carrying SIB2 is T2, then the UE needs to acquire SI having the periods T1 and T2.

The UE may select a corresponding preamble sequence according to at least one of the following criteria:

(1) selecting, based on the one or plurality of required SIBs and the received associations, a single preamble sequence associated with the greatest number of required SIBs;

(2) selecting, based on the one or plurality of required SIBs and the received associations, a single preamble sequence associated with the fewest number of not-required SIBs;

(3) selecting, based on the one or plurality of required SIBs and the received associations, one or a plurality of preamble sequences associated with the one or plurality of required SIBs having the fewest total number; and (4) selecting, based on the one or plurality of required SIBs and the received associations, different preamble sequences respectively associated with required SIBs of different priorities.

The implementation of respectively selecting a preamble sequence according to the above criteria (1)-(4) will be described in detail below with reference to specific examples.

Adopting Criterion (1)

Example 1.1: Assuming that the UE receives exemplary direct associations between preamble sequences and SIBs as follows:

A first preamble sequence is associated with a first SIB. That is, the UE may request the network to broadcast or unicast the first SIB by transmitting the first preamble sequence; and upon receiving the first preamble sequence, the network/base station may broadcast or unicast the first SIB to the UE.

A second preamble sequence is associated with the first SIB and a second SIB. That is, the UE may request the network/base station to broadcast or unicast the first SIB by transmitting the second preamble sequence; and after receiving the second preamble sequence, the network/base station may broadcast or unicast the first SIB and the second SIB to the UE.

Based on the above assumption, when the SIBs that the UE needs to acquire are the first SIB and the second SIB, since the first preamble sequence is associated with only one SIB that the UE requires, and the second preamble sequence is associated with two SIBs that the UE requires, the UE then selects the second preamble sequence. That is, the UE may select, according to one or a plurality of required SIBs (two in this example, but not limited thereto), a preamble sequence associated with the greatest number of required SIBs (or, relatively more/more/as many as possible).

Example 1.2: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with the first SI and a second SI. That is, the UE may request the network/base station to broadcast or unicast the first SI by transmitting the second preamble sequence; and after receiving the second preamble sequence, the network/base station may broadcast or unicast the first SI and the second SI to the UE.

The first SIB is contained in the first SI, and the second SIB is contained in the second SI.

Based on the above assumption, when the SIBs that the UE needs to acquire are the first SIB and the second SIB, since all SI associated with the first preamble sequence contains only one SIB that the UE requires, and all SI associated with the second preamble sequence contains two SIBs that the UE requires, the UE then selects the second preamble sequence. That is, the UE may determine, according to one or a plurality of required SIBs (two in this example, but not limited thereto), SI with which the one or plurality of required SIBs are associated; and the SI with which the one or plurality of required SIBs are associated may be considered as SI that the UE requires; and the UE may select a preamble sequence associated with the greatest required SIs (or, relatively more/more/as many as possible), or the greatest required SIBs (or, relatively more/more/as many as possible).

Example 1.3: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with a second SI. That is, the UE may request the network/base station to broadcast or unicast the second SI by transmitting the second preamble sequence; and after receiving the second preamble sequence, the network/base station may broadcast or unicast the second SI to the UE.

The first SIB is contained in the first SI, and the first SIB and the second SIB are contained in the second SI.

Based on the above assumption, when the SIBs that the UE needs to acquire are the first SIB and the second SIB, since the first SI contains only one SIB that the UE requires, and the second SI contains the two SIBs that the UE requires, the UE then selects the preamble sequence associated with the second SI, i.e., the second preamble sequence. That is, the UE may select, according to one or a plurality of required SIBs (two in this example, but not limited thereto), a preamble sequence corresponding to SI with which the greatest number of required SIBs (or, relatively more/more/as many as possible) are associated, or the greatest number of required SIBs (or, relatively more/more/as many as possible).

Adopting Criterion (2)

Example 2.1: Assuming that the UE receives exemplary direct associations between preamble sequences and SIBs as follows:

A first preamble sequence is associated with a first SIB and a second SIB. That is, the UE may request the network/base station to broadcast or unicast the first SIB and the second SIB by transmitting the first preamble sequence; and upon receiving the first preamble sequence, the network/base station may broadcast or unicast the first SIB and the second SIB to the UE.

A second preamble sequence is associated with the first SIB, the second SIB, and a third SIB. That is, the UE may request the network/base station to broadcast or unicast the first SIB, the second SIB, and the third SIB by transmitting the second preamble sequence; and upon receiving the second preamble sequence, the network/base station may broadcast or unicast the first SIB, the second SIB, and the third SIB to the UE.

Based on the above assumption, when the SIBs that the UE needs to acquire are the first SIB and the second SIB, since the first preamble sequence is associated with zero SIBs that the UE does not require (i.e., is not associated with SIBs that the UE does not require), and the second preamble sequence is associated with one SIB that the UE does not require, if the UE selects the second preamble sequence, the network/base station may broadcast or unicast the first SIB, the second SIB, and the third SIB to the UE; but because the third SIB is not required by the UE, this results in redundancy in transmission and reception. Therefore, the UE selects the first preamble sequence. That is, the UE may select, according to one or a plurality of required SIBs (two in this example, but not limited thereto), a preamble sequence associated with the fewest number of not-required SIBs (or, relatively less/less/as few as possible).

Example 2.2: Assuming that the UE receives exemplary indirect associations between preamble sequences and SIBs as follows:

A first preamble sequence is associated with a first SI and a second SI. That is, the UE may request the network/base station to broadcast or unicast the first SI and the second SI by transmitting the first preamble sequence; and upon receiving the first preamble sequence, the network/base station may broadcast or unicast the first SI and the second SI to the UE.

A second preamble sequence is associated with the first SI, the second SI, and a third SI. That is, the UE may request the network/base station to broadcast or unicast the first SI, the second SI, and the third SI by transmitting the second preamble sequence; and upon receiving the second preamble sequence, the network/base station may broadcast or unicast the first SI, the second SI, and the third SI to the UE.

The first SIB is contained in the first SI, and the second SIB is contained in the second SI.

Based on the above assumption, when the SIBs that the UE needs to acquire are the first SIB and the second SIB, the SI that UE requires is the first SI and the second SI. Since the first preamble sequence is associated with zero SI that the UE does not require (that is, all the corresponding SI is SI required by the UE), and the second preamble sequence is associated with one piece of SI that the UE does not require, if the UE selects the second preamble sequence, the network/base station may broadcast or unicast the first SI, the second SI, and the third SI to the UE; but because the third SI is not required by the UE, this results in redundancy in transmission and reception. Therefore, the UE selects the first preamble sequence. That is, the UE may determine the required SI according to one or a plurality of required SIBs (two in this example, but not limited thereto), and select a preamble sequence associated with the fewest number of not required SI (or, relatively less/less/as few as possible), or the fewest number of not required SIB (or, relatively less/less/as few as possible).

Example 2.3: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with a second SI. That is, the UE may request the network/base station to broadcast or unicast the second SI by transmitting the second preamble sequence; and after receiving the second preamble sequence, the network/base station may broadcast or unicast the second SI to the UE.

The first SI contains a first SIB and a second SIB; the second SI contains a first SIB, a second SIB, and a third SIB.

Based on the above assumption, when the SIBs that the UE needs to acquire are the first SIB and the second SIB, since the first SI contains zero SIBs that UE does not require (i.e., does not contain SIBs that the UE does not require), and the second SI contains one SIB that the UE does not require, if the UE selects the preamble sequence associated with the second SI, the network/base station may broadcast or unicast to the UE the second SI, i.e., the first SIB, the second SIB, and the third SIB; but because the third SIB is not required by the UE, this results in redundancy in transmission and reception. Therefore, the UE selects the preamble sequence associated with the first SI, i.e., the first preamble sequence. That is, the UE may select, according to one or a plurality of required SIBs (two in this example, but not limited thereto), a preamble sequence associated with SI with which the fewest number of not-required SIB (or, relatively less/less/as few as possible) is associated, or to the fewest number of not required SIB (or, relatively less/less/as few as possible).

Adopting Criterion (3)

Example 3.1: Assuming that the UE receives exemplary direct associations between preambles and SIBs as follows:

A first preamble sequence is associated with a first SIB. That is, the UE may request the network to broadcast or unicast the first SIB by transmitting the first preamble sequence; and upon receiving the first preamble sequence, the network/base station may broadcast or unicast the first SIB to the UE.

A second preamble sequence is associated with a second SIB. That is, the UE may request the network/base station to broadcast or unicast the second SIB by transmitting the second preamble sequence; and after receiving the second preamble sequence, the network/base station may broadcast or unicast the second SIB to the UE.

A third preamble sequence is associated with the first SIB and the second SIB. That is, the UE may request the network/base station to broadcast or unicast the first SIB and the second SIB by transmitting the third preamble sequence; and upon receiving the third preamble sequence, the network/base station may broadcast or unicast the first SIB and the second SIB to the UE.

Based on the above assumption, when the SIBs that the UE needs to acquire are the first SIB and the second SIB, since the first preamble sequence is associated with only one SIB IUE requires, and the second preamble sequence is associated with only one SIB that the UE requires, if the first/second preamble sequence is selected, the UE further needs to select the second/first preamble sequence to acquire the first SIB and the second SIB; that is, the UE needs to transmit two preamble sequences to acquire all the required SIBs. However, the third preamble sequence is associated with the two SIBs that the UE requires. In other words, the UE only needs to transmit one preamble sequence to obtain all the required SIBs; therefore, the UE selects the third preamble sequence rather than the first or the second preamble sequence. That is, the UE may select, according to one or a plurality of required SIBs (two in this example, but not limited thereto), one or a plurality of preamble sequences requiring the fewest number of transmitting times (or, relatively less/less/as few as possible) that are associated with the one or plurality of required SIBs.

Example 3.2: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with a second SI. That is, the UE may request the network/base station to broadcast or unicast the second SI by transmitting the second preamble sequence; and after receiving the second preamble sequence, the network/base station may broadcast or unicast the second SI to the UE.

A third preamble sequence is associated with the first SI and the second SI. That is, the UE may request the network/base station to broadcast or unicast the first SI and the second SI by transmitting the third preamble sequence; and upon receiving the third preamble sequence, the network/base station may broadcast or unicast the first SI and the second SI to the UE.

The first SIB is contained in the first SI, and the second SIB is contained in the second SI.

Based on the above assumption, when the SIBs that the UE needs to acquire are the first SIB and the second SIB, since all the SI associated with the first preamble sequence contains only one SIB that the UE requires, all the SI associated with the second preamble sequence contains only one SIB that the UE requires, and all the SI associated with the third preamble sequence contain the two SIBs that the UE requires, as described above, the third preamble sequence is selected; and the UE only needs to transmit the preamble sequence once to obtain all the SI containing all the SIBs that the UE requires. Therefore, the UE selects the third preamble sequence rather than the first or the second preamble sequence. That is, the UE may determine, according to one or a plurality of required SIBs (two in this example, but not limited thereto), SI with which these SIBs are associated, and the SI with which these SIBs are associated may be considered as the SI required by the UE; and the UE may select one or a plurality of preamble sequences requiring the fewest number of transmitting times (or, relatively less/less/as few as possible) that are associated with the required SI or required SIBs.

Example 3.3: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with a second SI. That is, the UE may request the network/base station to broadcast or unicast the second SI by transmitting the second preamble sequence; and after receiving the second preamble sequence, the network/base station may broadcast or unicast the second SI to the UE.

A third preamble sequence is associated with a third SI. That is, the UE may request the network/base station to broadcast or unicast the third SI by transmitting the third preamble sequence; and after receiving the third preamble sequence, the network/base station may broadcast or unicast the third SI to the UE.

The first SI contains a first SIB; the second SI contains a second SIB; and the third SI contains the first SIB and the second SIB.

Based on the above assumption, when the SIBs that the UE needs to acquire are the first SIB and the second SIB, since the first/second SI contains only one SIB that the UE requires, and the third SI contains all the SIBs that the UE requires, if the UE selects the preamble sequence associated with the third SI, the UE only needs to transmit the preamble sequence once to obtain all the SIBs that the UE requires; therefore, the UE selects the preamble sequence associated with the third SI, i.e., the third preamble sequence. That is, the UE may determine, according to one or a plurality of required SIBs (two in this example, but not limited thereto), SI with which these SIBs are associated, and the SI with which these SIBs are associated may be considered as the SI required by the UE; and the UE may select one or a plurality of preamble sequences requiring the fewest number of transmitting times (or, relatively less/less/as few as possible) that are associated with the required SI or required SIBs.

Adopting Criterion (4)

Example 4.1: Assuming that the UE receives exemplary direct associations between preamble sequences and SIBs as follows:

A first preamble sequence is associated with a first SIB. That is, the UE may request the network to broadcast or unicast the first SIB by transmitting the first preamble sequence; and upon receiving the first preamble sequence, the network/base station may broadcast or unicast the first SIB to the UE.

A second preamble sequence is associated with a second SIB. That is, the UE may request the network/base station to broadcast or unicast the second SIB by transmitting the second preamble sequence; and after receiving the second preamble sequence, the network/base station may broadcast or unicast the second SIB to the UE.

A third preamble sequence is associated with the first SIB and the second SIB. That is, the UE may request the network/base station to broadcast or unicast the first SIB and the second SIB by transmitting the third preamble sequence;

and upon receiving the third preamble sequence, the network/base station may broadcast or unicast the first SIB and the second SIB to the UE.

The first SIB is a necessary SIB for the UE. The so-called necessary SIB may refer to system information that the UE has to acquire in order to support or initiate/activate/complete a certain feature or function at that current moment, i.e., system information that the UE needs to acquire in order to work normally. The second SIB is an unnecessary SIB for the UE. The so-called unnecessary SIB means that the UE can work normally even if the SIB is not acquired.

Based on the above assumption, when the SIBs that the UE needs to acquire are the first SIB and the second SIB, since the importance/priorities of the first SIB and the second SIB are different, the UE may process the SIBs differently if acquisitions for the SIBs are not successful. In this case, the UE thus selects the first preamble sequence and the second preamble sequence, and does not select the third preamble sequence. That is, when the UE needs to acquire both a necessary SIB and an unnecessary SIB, preamble sequences that the UE selects for acquiring the necessary SIB and for acquiring the unnecessary SIB are different. That is, the UE may respectively select, according to importance/priorities of one or a plurality of required SIBs, different preamble sequences associated with required SIBs of different importance/priorities.

Example 4.2: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with a second SI. That is, the UE may request the network/base station to broadcast or unicast the second SI by transmitting the second preamble sequence; and after receiving the second preamble sequence, the network/base station may broadcast or unicast the second SI to the UE.

A third preamble sequence is associated with the first SI and the second SI. That is, the UE may request the network/base station to broadcast or unicast the first SI and the second SI by transmitting the third preamble sequence; and upon receiving the third preamble sequence, the network/base station may broadcast or unicast the first SI and the second SI to the UE.

The first SIB is contained in the first SI, and the second SIB is contained in the second SI.

The first SIB is a necessary SIB for the UE. The so-called necessary SIB may refer to system information that the UE has to acquire in order to support or initiate/activate/complete a certain feature or function at that current moment, i.e., system information that the UE needs to acquire in order to work normally. The second SIB is an unnecessary SIB for the UE. The so-called unnecessary SIB means that the UE can work normally even if the SIB is not acquired.

Based on the above assumption, when the SIBs that the UE needs to acquire are the first SIB and the second SIB, since the importance/priorities of the first SIB and the second SIB are different, the UE may process the SIBs differently if acquisitions for the SIBs are not successful. In this case, the UE thus selects the first preamble sequence and the second preamble sequence, and does not select the third preamble sequence. That is, when the UE needs to acquire both a necessary SIB and an unnecessary SIB, the preamble sequences that the UE selects that are associated with SI containing the necessary SIB and with SI containing the unnecessary SIB are different. That is, the UE may determine, according to importance/priorities of one or a plurality of required SIBs, SI with which the one or plurality of required SIBs are associated, and select, for these SI, different preamble sequences respectively associated with SI with which required SIBs of different importance/priorities are associated.

Example 4.3: Assuming that the UE receives exemplary indirect associations between preamble sequences and SIBs as follows:

A first preamble sequence is associated with a first SI. That is, the UE may request the network to broadcast or unicast the first SI by transmitting the first preamble sequence; and upon receiving the first preamble sequence, the network/base station may broadcast or unicast the first SI to the UE.

A second preamble sequence is associated with a second SI. That is, the UE may request the network/base station to broadcast or unicast the second SI by transmitting the second preamble sequence; and after receiving the second preamble sequence, the network/base station may broadcast or unicast the second SI to the UE.

A third preamble sequence is associated with third SI. That is, the UE may request the network/base station to broadcast or unicast the third SI by transmitting the third preamble sequence; and after receiving the third preamble sequence, the network/base station may broadcast or unicast the third SI to the UE.

The first SI contains a first SIB; the second SI contains a second SIB; and the third SI contains the first SIB and the second SIB;

the first SIB is a necessary SIB for the UE. The so-called necessary SIB may refer to system information that the UE has to acquire in order to support or initiate/activate/complete a certain feature or function at that current moment, i.e., system information that the UE needs to acquire in order to work normally. The second SIB is an unnecessary SIB for the UE. The so-called unnecessary SIB means that the UE can work normally even if the SIB is not acquired.

Based on the above assumption, when the SIBs that the UE needs to acquire are the first SIB and the second SIB, since the importance/priorities of the first SIB and the second SIB are different, the UE may process the SIBs differently if acquisitions for the SIBs are not successful. The UE thus selects the first preamble sequence and the second preamble sequence, and does not select the third preamble sequence. When the UE needs to acquire both a necessary SIB and an unnecessary SIB, the preamble sequences that the UE selects that are associated with SI containing the necessary SIB and with SI containing the unnecessary SIB are different. That is, the UE may determine, according to importance/priorities of one or a plurality of required SIBs, SI with which the one or plurality of required SIBs are associated, and select, for these SI, different preamble sequences respectively associated with SI with which required SIBs of different importance/priorities are associated.

Although implementations for selecting a preamble sequence by adopting one of the foregoing criteria (1)-(4) are respectively described above in combination with specific examples, it should be noted that any combination of the foregoing criteria (1)-(4) may be adopted when selecting a preamble sequence. Preferably, the above criteria (1)-(4) may be ranked according to predetermined requirements. For example, in the process of selection, the UE first adopts criterion (4) to distinguish between a necessary SIB and an unnecessary SIB, and then adopts one of the above criteria (1)-(3) or any combination thereof to select a preamble sequence for the necessary and unnecessary SIBs respectively. Further, prior to or simultaneously with selecting a preamble sequence by adopting one or any combination of the above criteria (1)-(4), preamble sequences for selection are at least mapped to one or a plurality of SIBs that the UE requires, or mapped to one or a plurality of pieces of SI with which the SIBs that the UE requires are associated. That is, when selecting a preamble sequence, the UE first excludes one or a plurality of preamble sequences; and all the SIBs or all the SI mapped to the one or plurality of excluded preamble sequences are those that the UE will not acquire; and the UE may then select the preamble sequence from the remaining ones by adopting one or any combination of the above criteria (1)-(4). Or, the UE adopts the above criteria to select a preamble sequence only from one or a plurality of preamble sequences that can be mapped to a required SIB/SI.

Thus, in another implementation of step S102, the UE may select, based on priorities of one or a plurality of required SIBs and the received associations, different preamble sequences respectively associated with required SIBs of different priorities (i.e., adopting criterion (4); and then select, for the required SIBs of different priorities, corresponding preamble sequences based on the one or plurality of required SIBs and the received associations according to at least one of the following respective criteria (1)-(3):

(1) selecting a single preamble sequence associated with the greatest number of required SIBs;

(2) selecting a single preamble sequence associated with the fewest number of not-required SIBs; and (3) selecting one or a plurality of preamble sequences associated with the one or plurality of required SIBs having the fewest total number.

For example, criterion (1) may be adopted first to select a preamble sequence, followed by adopting criterion (2) for selecting a preamble sequence.

The selection method and process in step S102 may be performed by an RRC layer, or may be performed by a MAC layer.

In step S103, the UE may transmit the selected preamble sequences to the base station so as to send a request to the base station for the one or plurality of required SIBs.

Specifically, in an implementation, the UE may indicate the selected preamble sequence to an underlying/lower layer, which may specifically be indicating the preamble sequence to the MAC layer. The MAC may further determine, based on the indicated preamble sequence, whether the preamble sequence is to be used for acquiring system information or for other behaviors, such as for handover. It is also possible that the UE indicates to an underlying/lower layer (for example, the MAC layer) that system information is to be acquired, or requests to acquire system information, and indicates the selected preamble sequence to the underlying/lower layer. This indication may be indicated by the RRC layer to the underlying/lower layer.

The UE may then transmit the selected preamble sequence. Specifically, a random access procedure may be initiated/triggered, and the preamble sequence is transmitted on a time-frequency resource for random access. It is also possible that the UE initiates/triggers a random access procedure based on a previous indication (a specified preamble sequence or an instruction to acquire system information). The initiating/triggering the random access procedure may be performed at the MAC layer.

After step S103, the UE may receive response information from the base station, which specifically may be response information carrying the preamble sequence information, such as carrying a RAPID, a preamble ID number, etc. This enables the UE to receive/acquire the SI/SIB.

In another implementation, in step S103, the UE may indicate the selected preamble sequence (or preamble sequence index number/identification number) to an underlying/lower layer, which may specifically be directly indicating/delivering the preamble sequence (or preamble sequence index number/identification number) to the MAC layer or a physical layer. It is also possible that the UE indicates to an underlying/lower layer (for example, the MAC layer) that system information is be acquired, or requests to acquire system information, and indicates the preamble sequence (or preamble sequence index number/identification number) to the underlying/lower layer. One preamble sequence (or preamble sequence index number/identification number) may be indicated/delivered, or a plurality of preamble sequences (or preamble sequence index numbers/identification numbers) may be indicated/delivered.

When a plurality of preamble sequences are indicated/delivered, an underlying/lower layer (for example, the MAC layer) may rank the preamble sequences to determine their transmission order. Specifically, the underlying/lower layer may also buffer the preamble sequences in accordance with the ranking in a buffer for example.

These preamble sequences are then transmitted separately during a random access procedure according to the ranking of the preamble sequences in the buffer or a determined transmission order. It is also possible that one preamble sequence is transmitted in a random access procedure, or a plurality of preamble sequences may be transmitted in a random access procedure. When a plurality of random access procedures are required to complete the transmission of all preamble sequences, the UE may initiate a new random access procedure to transmit preamble sequences that have not been transmitted or to transmit the remaining preamble sequences when an underlying layer or a lower layer, for example, the MAC layer, receives a response message carrying preamble sequence-related information, or when or after indication to an upper layer that random access is successfully completed, or when or after feedback of preamble sequence information to the upper layer is completed. This process may continue until all the preamble sequences have been transmitted.

In another implementation, when an underlying layer or a lower layer, such as the MAC layer, receives a response message carrying preamble sequence (or preamble sequence index number/identification number) related information, the underlying layer or the lower layer, such as the MAC layer, may indicate to an upper layer, such as the RRC layer, that the preamble sequence (or preamble sequence index number/identification number) is successfully transmitted, or indicate that the random access procedure is successfully completed.

Then, based on the indication, the UE receives/acquires SI/SIB according to the scheduling information of the SI. Herein, one implementation method may be that when the UE indicates the selected preamble sequence (or preamble sequence index number/identification number) to an underlying/lower layer, corresponding SI/SIB has already been determined; therefore, when the underlying layer or the lower layer indicates that the preamble sequence is successfully transmitted or that a random access procedure is successfully completed, the UE learns the one or a plurality of pieces of SI/SIBs that are associated with the preamble sequence, thereby receiving the corresponding SI/SIB(s) according to the scheduling information of the SI/SIB(s).

Further, it is also possible that when receiving a response message carrying preamble sequence (or preamble sequence index number/identification number) related information, an underlying layer or a lower layer, such as the MAC layer, indicates the preamble sequence (or preamble sequence index number/identification number) related information, such as an RAPID, back to an upper layer, such as the RRC layer.

Then, based on the indication back, the UE receives/acquires the SI or SIB associated with the preamble sequence (or preamble sequence index number/identification number).

Further, it is also possible that when the UE receives acknowledgement information for an SI request, the UE starts to acquire an SI message.

Figure 2:
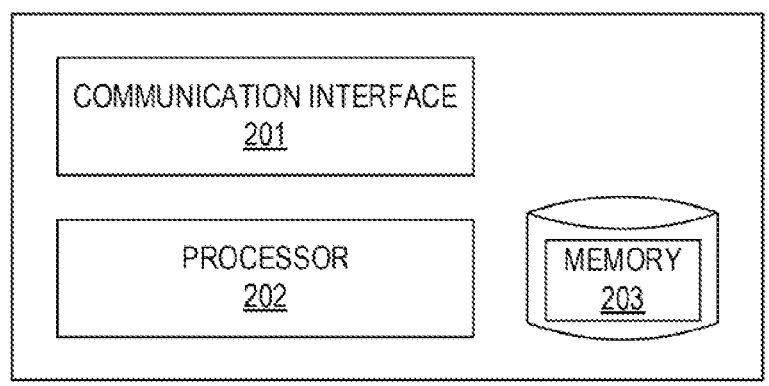
FIG. 2 schematically shows a structural block diagram of UE according to an exemplary embodiment of the present disclosure.

A structure of UE according to an exemplary embodiment of the present invention will be described below with reference to FIG. 2. FIG. 2 schematically shows a structural block diagram of the UE according to an exemplary embodiment of the present invention. The UE 200 can be used for executing the method 100 described with reference to FIG. 1. For simplicity, only a schematic structure of the UE according to the exemplary embodiment of the present disclosure will be described herein, and details already given for the method 100 described above with reference to FIG. 1 are omitted.

As shown in FIG. 2, the UE 200 may comprise a communication interface 201 for external communication, configured to receive, from a base station, information that carries direct or indirect associations between preamble sequences and system information blocks (SIBs); a processing unit or processor 202, which may be a single unit or a combination of a plurality of units for executing different steps of the method; and a memory 203 storing computer-executable instructions thereon.

In an embodiment in which the UE 200 is used for executing the method 100, when the instructions are executed by the processor 202, the processor 202 is enabled to execute the following procedure:

selecting a corresponding preamble sequence based on one or a plurality of required SIBs and received associations according to at least one of the following criteria:

selecting a single preamble sequence associated with the greatest number of required SIBs;

selecting a single preamble sequence associated with the fewest number of not-required SIBs;

selecting one or a plurality of preamble sequences associated with the one or plurality of required SIBs having the fewest total number;

selecting, according to a priority of the one or plurality of required SIBs, different preamble sequences respectively associated with required SIBs of different priorities; and the communication interface 201 is further configured to transmit the selected preamble sequences to the base station so as to send a request to the base station for the one or plurality of required SIBs.

According to another exemplary embodiment of the present disclosure, the UE 200 may comprise a communication interface 201 for external communication, configured to receive, from a base station, information that carries direct or indirect associations between preamble sequences and system information blocks (SIBs); a processing unit or processor 202, which may be a single unit or a combination of a plurality of units for executing different steps of the method; and a memory 203 storing computer-executable instructions thereon.

When the instructions are executed by the processor 202, the processor 202 is enabled to execute the following procedure:

selecting, based on one or a plurality of required SIBs and the received associations, different preamble sequences respectively associated with required SIBs of different priorities;

selecting, for the required SIBs of different priorities, corresponding preamble sequences based on the one or plurality of required SIBs and the received associations according to at least one of the following criteria:

selecting a single preamble sequence associated with the greatest number of required SIBs;

selecting a single preamble sequence associated with the fewest number of not-required SIBs; and selecting one or a plurality of preamble sequences associated with the one or plurality of required SIBs having the fewest total number.

A method executed at a base station for transmitting SI/SIB that UE requests according to an exemplary embodiment of the present disclosure will be described below with reference to FIG. 3.

Figure 3:
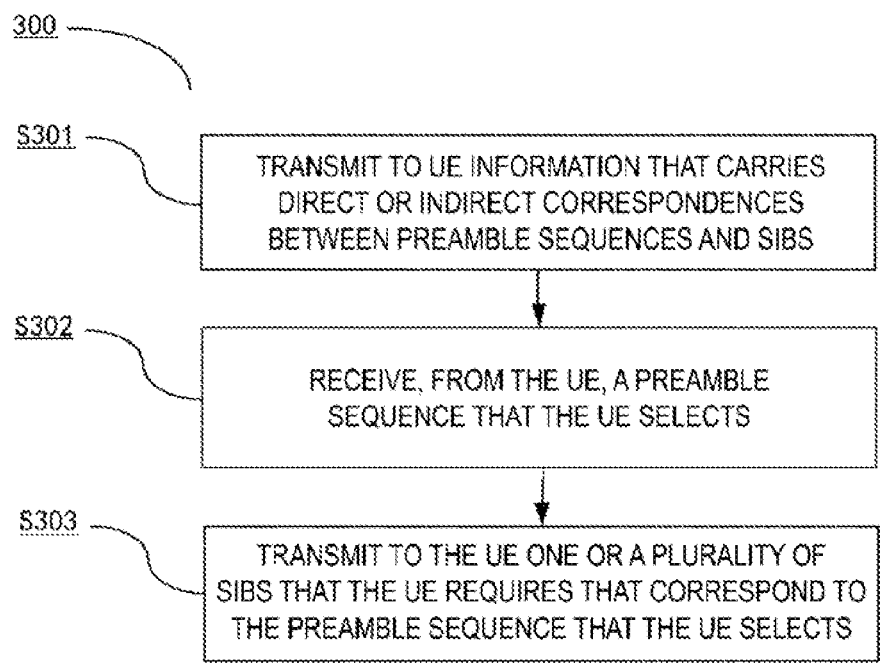
FIG. 3 schematically shows a flowchart of a method executed at a base station for transmitting SI/SIB requested by UE according to an exemplary embodiment of the present disclosure.

FIG. 3 schematically shows a flowchart of a method 300 executed at a base station for transmitting SI/SIB that the UE requests according to an exemplary embodiment of the present disclosure. As shown in FIG. 3, the method 300 may comprise steps S301, S302, and S303.

In step S301, the base station may transmit to UE information that carries direct or indirect associations between preamble sequences and SIBs.

In step S302, the base station may receive, from the UE, a preamble sequence that the UE selects.

In step S303, the base station may transmit to the UE one or a plurality of SIBs that the UE requires that are associated with the preamble sequence that the UE selects.

The UE selects the preamble sequence based on one or a plurality of required SIBs and the received associations according to at least one of the following criteria:

selecting a single preamble sequence associated with the greatest number of required SIBs;

selecting a single preamble sequence associated with the fewest number of not-required SIBs; and selecting one or a plurality of preamble sequences associated with the one or plurality of required SIBs having the fewest total number; and selecting, according to a priority of the one or plurality of required SIBs, different preamble sequences respectively associated with required SIBs of different priorities.

In another exemplary embodiment, the UE selects the preamble sequences by: first selecting, based on priorities of one or a plurality of required SIBs and the received associations, different preamble sequences respectively associated with required SIBs of different priorities, and then select for the required SIBs of different priorities, corresponding preamble sequences based on the one or plurality of required SIBs and the received associations according to at least one of the following criteria:

selecting a single preamble sequence associated with the greatest number of required SIBs;

selecting a single preamble sequence associated with the fewest number of not-required SIBs; and selecting one or a plurality of preamble sequences associated with the one or plurality of required SIBs having the fewest total number.

Figure 4:
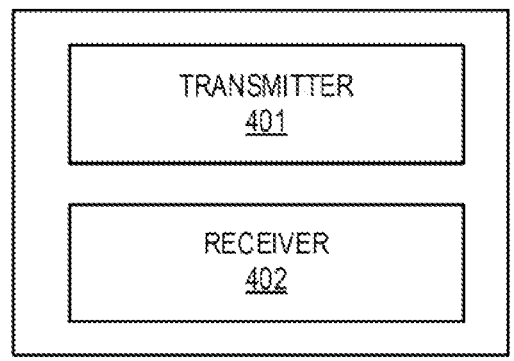
FIG. 4 schematically shows a structural block diagram of a base station according to an exemplary embodiment of the present disclosure.

A structure of a base station according to an exemplary embodiment of the present invention will be described below with reference to FIG. 4. FIG. 4 schematically shows a structural block diagram of a base station according to an embodiment of the present invention. The base station 400 can be used for executing the method 300 described with reference to FIG. 3. For simplicity, only a schematic structure of the base station according to the exemplary embodiment of the present disclosure will be described herein, and details already given for the method 300 described above with reference to FIG. 3 are omitted.

As shown in FIG. 4, the base station 400 may comprise a transmitter 401, configured to transmit to UE information carrying direct or indirect associations between preamble sequences and system information blocks (SIBs); and a receiver 402, configured to receive, from the UE, a preamble sequence that the UE selects.

The transmitter 401 is further configured to transmit to the UE one or a plurality of SIBs that the UE requires that are associated with the preamble sequence that the UE selects.

A program running on the device according to the present disclosure may be a program that enables a computer to implement the functions of the embodiments of the present disclosure by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-piece integrated circuits). Circuits designed to execute the functions described in the present specification may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be used interchangeably.

What is claimed is:

1. A method for providing System Information (SI), the method comprising:
    transmitting information about first associations between a plurality of preamble sequences and a plurality of pieces of SI, and about second associations between the pieces of SI and a plurality of system information blocks (SIBs);
    receiving a preamble from a user equipment (UE), wherein the preamble includes one of the preamble sequences;
    identifying one of the SIBs based on the one of the preamble sequences, the first associations, and the second associations, wherein the one of the SIBs is included in one of the pieces of SI associated with the one of the preamble sequences; and
    transmitting the one of the SIBs to the UE.

2. The method of claim 1, wherein the one of the pieces of SI is required by a Radio Resource Control (RRC) layer of the UE.

3. The method of claim 1, wherein the one of the preamble sequences is used for acquiring SI or for handover.

4. The method of claim 1, wherein the one of the preamble sequences indicates an SI request.

5. The method of claim 1, wherein:
    the one of the SIBs is a first SIB, wherein the first SIB is a first one of the SIBs;
    the one of the pieces of SI is associated with the first SIB and a second SIB, wherein the second SIB is a second one of the SIBs; and
    the first SIB and the second SIB have a same scheduling period.

6. The method of claim 1, wherein identifying the one of the SIBs based on the one of the preamble sequences, the first associations, and the second associations comprises:
    determining the one of the pieces of SI based on the one of the preamble sequences and the first associations; and
    selecting the one of the SIBs based on the one of the pieces of SI and the second associations.

7. The method of claim 1, wherein the one of the preamble sequences is selected based on a piece of SI required by the UE, the first associations, and the second associations.

8. A base station (BS), comprising:
    a memory storing instructions; and
    at least one processor configured to execute the instructions to cause the BS to:
    transmit information about first associations between a plurality of preamble sequences and a plurality of pieces of SI, and about second associations between the pieces of SI and a plurality of system information blocks (SIBs);

receive a preamble from a user equipment (UE), wherein the preamble includes one of the preamble sequences;

identify one of the SIBs based on the one of the preamble sequences, the first associations, and the second associations, wherein the one of the SIBs is included in one of the pieces of SI associated with the one of the preamble sequences; and transmit the one of the SIBs to the UE.

9. The BS of claim 8, wherein the one of the pieces of SI is required by a Radio Resource Control (RRC) layer of the UE.

10. The BS of claim 8, wherein the one of the preamble sequences is used for acquiring SI or for handover.

11. The BS of claim 8, wherein the one of the preamble sequences indicates an SI request.

12. The BS of claim 8, wherein:
the one of the SIBs is a first SIB, wherein the first SIB is a first one of the SIBs;
the one of the pieces of SI is associated with the first SIB and a second SIB, wherein the second SIB is a second one of the SIBs; and
the first SIB and the second SIB have a same scheduling period.

13. The BS of claim 8, wherein the at least one processor is configured to execute the instructions to cause the BS to identify the one of the SIBs based on the one of the preamble sequences, the first associations, and the second associations by:
determining the one of the pieces of SI based on the one of the preamble sequences and the first associations; and
selecting the one of the SIBs based on the one of the pieces of SI and the second associations.

14. The BS of claim 8, wherein the one of the preamble sequences is selected based on a piece of SI required by the UE, the first associations, and the second associations.

15. A user equipment (UE), comprising:
a memory storing instructions; and
a processor configured to execute the instructions to cause the UE to:
trigger a medium access control (MAC) layer to initiate a random access procedure for transmitting a preamble, wherein the preamble corresponds to a piece of system information (SI), wherein the piece of SI is required by a radio resource control (RRC) layer of the UE;
receive, in the RRC layer, an indication from the MAC layer;
acquire, in the RRC layer, the piece of SI required by the RRC layer of the UE when the indication is received from the MAC layer;
receive information about a plurality of preamble sequences, a plurality of pieces of SI, and a plurality of system information blocks (SIBs), wherein:
a first one of the pieces of SI is required by the UE,
a second one of the pieces of SI is associated with two of the SIBs, and
the two of the SIBs have a same scheduling period;
select one of the preamble sequences based on the information and the first one of the pieces of SI required by the UE; and
transmit the selected one of the preamble sequences as the preamble to a base station.

16. The UE according to claim 15, wherein the processor is further configured to execute the instructions to cause the UE to:
determine, in the MAC layer, whether the one of the preamble sequences is used for acquiring SI or for handover.

17. The UE according to claim 15, wherein the indication comprises an acknowledgement for an SI request.

* * * * *